Feb. 21, 1950

S. DYK 2,498,603

CABLE TENSIONING DEVICE

Filed Oct. 10, 1947

Inventor

Simon Dyk

By Clarence A. O'Brien
and Harvey B. Jacobson
Attorneys

Feb. 21, 1950　　　　　S. DYK　　　　　2,498,603
CABLE TENSIONING DEVICE
Filed Oct. 10, 1947　　　　　3 Sheets-Sheet 2
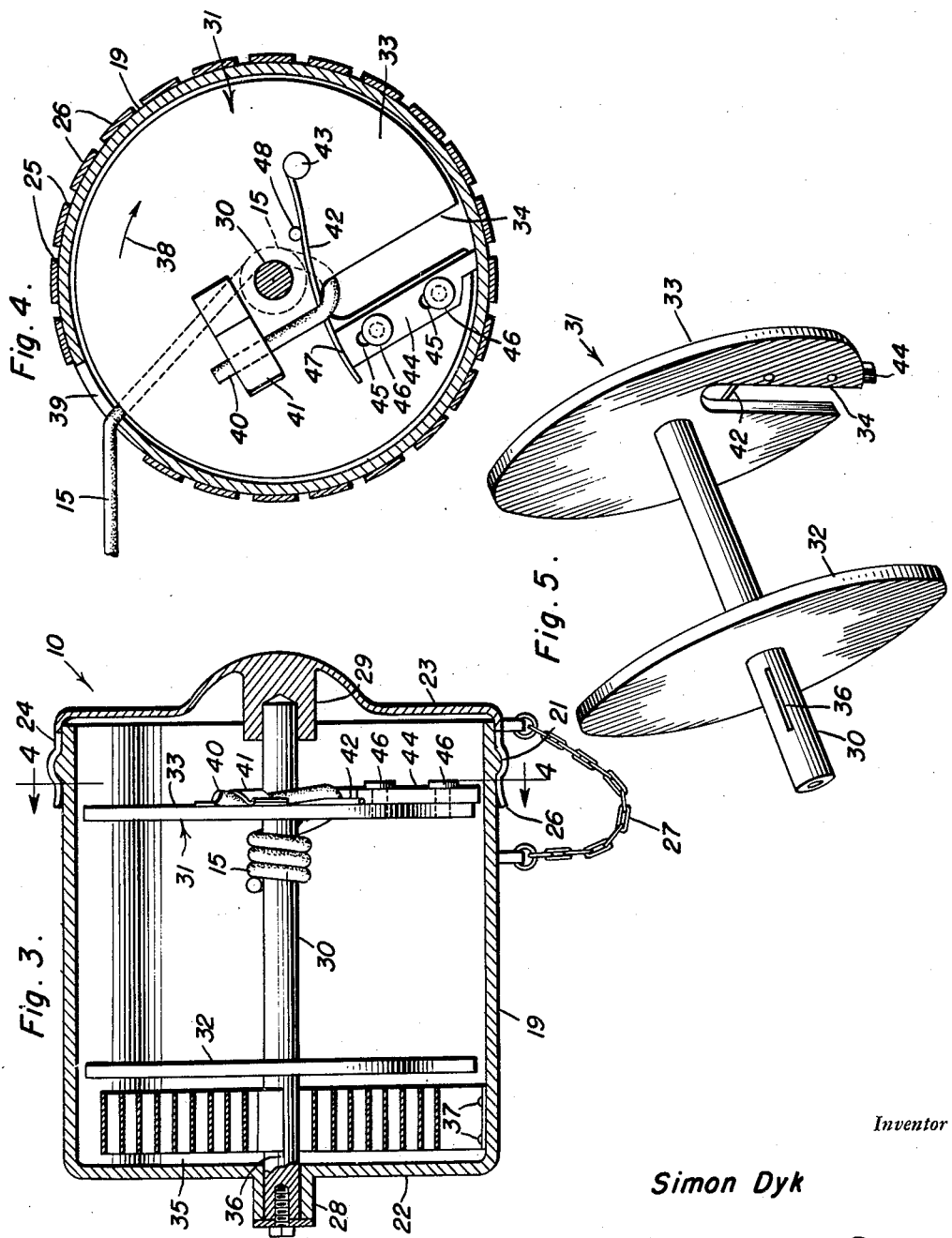
Inventor
Simon Dyk Feb. 21, 1950     S. DYK     2,498,603
CABLE TENSIONING DEVICE
Filed Oct. 10, 1947     3 Sheets-Sheet 3
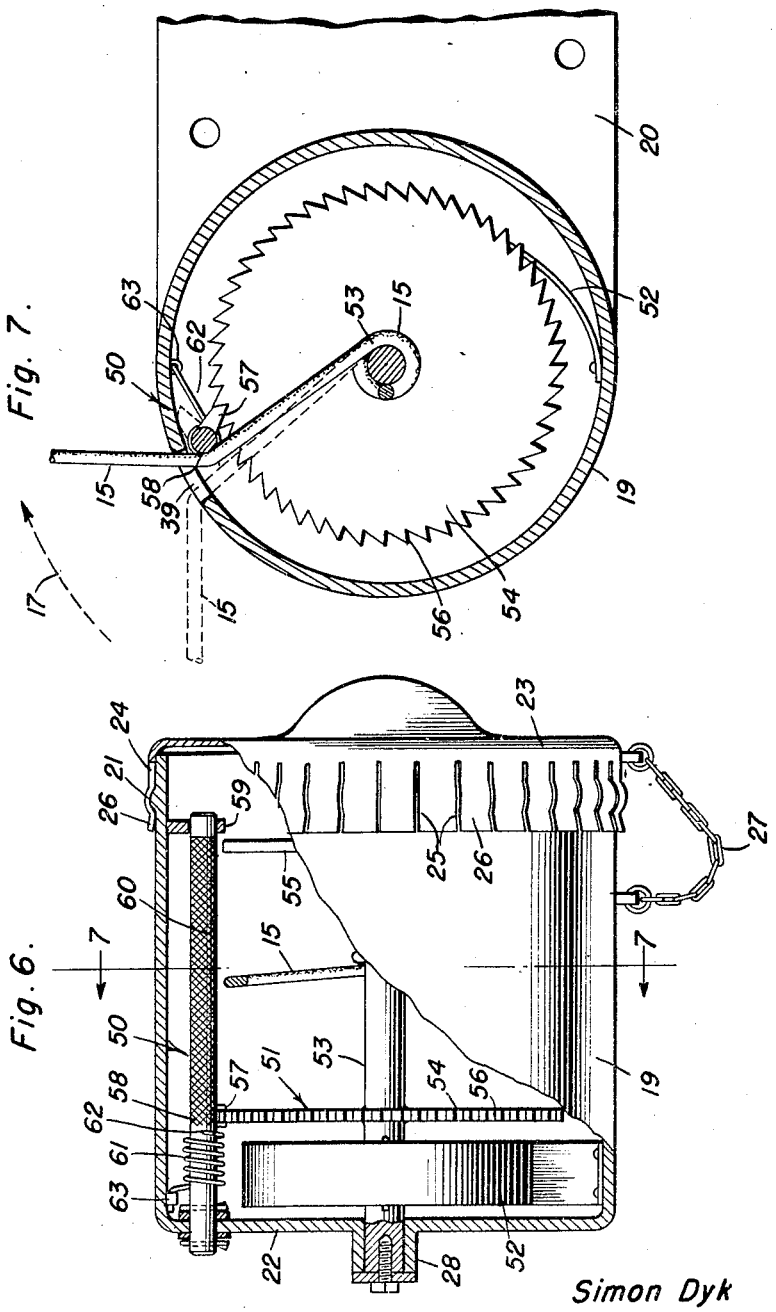
Inventor
Simon Dyk
By Clarence A. O'Brien
and Harvey B. Jacobson
Attorneys Patented Feb. 21, 1950

2,498,603

UNITED STATES PATENT OFFICE 2,498,603

CABLE TENSIONING DEVICE

Simon Dyk, Manhattan, Mont.

Application October 10, 1947, Serial No. 779,098

6 Claims. (Cl. 242—107)

This invention relates to new and useful improvements and structural refinements in tensioning devices for cables, more specifically, cables such as are commonly employed for controlling the operation of tractor-drawn agricultural implements, and the principal object of the invention is to provide a device of the character herein described which will maintain the control cable in a taut condition, so that it may be readily grasped and actuated by the driver of the tractor, without the previously experienced inconvenience of the driver having to pull the cable for some distance in order to take up the slack therein, before actuation itself could be effected.

A further object of the invention is to provide a cable tensioning device which will readily adjust itself so as to accommodate draw bars of various lengths (between the drawing and drawn implement) and which embodies in its construction what may be referred to as a safety release of the cable in the event that the draw bar becomes accidentally or unintentionally disconnected.

Another object of the invention is to provide a cable tensioning device which is simple in construction, instantaneous in response to actuation on the cable, and which may be easily and quickly attached to tractors and other similar pieces of agricultural implements.

An additional object of the invention is to provide a cable tensioning device which will readily lend itself to economical manufacture and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 3 is a cross-sectional view of the tensioning device per se;

Figure 4 is a cross-sectional view, taken substantially in the plane of the line 4—4 in Figure 3;

Figure 5 is a perspective view of a reel used in the invention;

Figure 6 is a cross-sectional view, similar to that shown in Figure 3, but illustrating a modified embodiment of the invention, and Figure 7 is a cross-sectional view, taken substantially in the plane of the line 7—7 in Figure 6.

Like characters of reference are used to designate like parts in the specification and throughout the several views.

Figure 1:
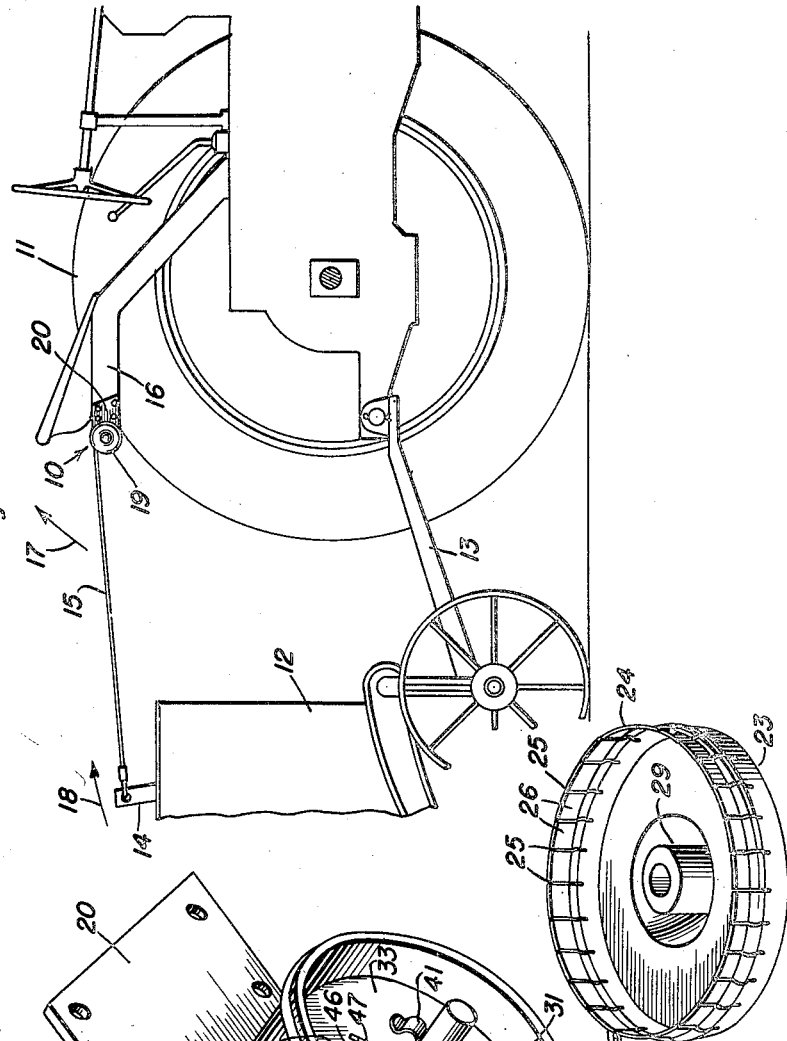
Figure 1 is a fragmentary side elevatinal view of a tractor and a drawn implement, showing the invention associated therewith.

Referring now to the accompanying drawings in detail, more specifically to Figures 1-5 inclusively, the invention consists of a cable tensioning device designated generally by the reference character 10, the same being adapted for use in association with a drawing implement, such as for example, a tractor 11, and a drawn implement of any suitable type, indicated at 12, which is connected to the tractor 11 by means of a suitable draw bar 13.

The implement 12 is controlled or actuated by means of a lever 14 which, in accordance with existing practice, is provided with a loose or slack cable 15, as shown in Figure 1. However, in existing practice, the forward end of this cable is attached to some portion of the framework of the tractor 11, such as for example, the seat support 16, and by turning around somewhat and pulling the cable 15 upwardly in the direction of the arrow 17, the driver of the tractor 11 controls or actuates the implement 12 by tripping the lever 14 in the direction 18, as will be clearly understood. Inasmuch as the cable 15, in conventional practice, must necessarily be slack so as to allow the two implements to negotiate curves, or the like, considerable lost motion exists in the direction of the arrow 17 (upon the driver's actuation of the cable 15) before movement of the trip lever 14 is effected.

As aforesaid, it is the primary purpose of the instant invention to eliminate this slackness by providing the tensioning device 10 which includes in its construction a drum-shaped housing 19, rigidly secured by means of a mounting bracket 20 to some portion of the framework of the tractor, preferably the seat support 16.

The drum-shaped framework or housing 19 is open at one end thereof and is formed at its open end, for purposes of reinforcement, with an annular bead 21, while its remaining end is closed as at 22. A cover 23 is adapted for removable positioning on the open end of the housing 19, for which purpose the cover is provided with a perimetric flange 24 formed with a series of spaced parallel slots or notches 25 which define a plurality of resilient tongues 26. This is best illustrated in the accompanying Figure 2, and it will be apparent that when the cover 23 is installed in position, the tongues 26 will frictionally engage the aforementioned bead 21, so that removable retention of the cover on the housing is facilitated.

One end of a length of chain 27 may be secured to the housing, while the remaining end of the chain is secured to the cover, so as to prevent the latter from becoming accidentally misplaced or lost.

The closed end 22 as well as the cover 23 are formed with diametrically aligned, centrally disposed bosses 28, 29 respectively, which provide bearings for a shaft 30 of a winding reel designated generally by the reference character 31.

This reel also includes a pair of side flanges 32, 33, the latter being provided with a substantially radial slot 34 which extends inwardly from the perimetric or circumferential edge of the flange 33, as is best shown in Figures 4 and 5. The function of this slot will be hereinafter more fully described.

A spiral spring 35 is also associated with the reel 31, one end of this spring being secured in a diametrically extending slot 36 formed in the shaft 30, while the remaining end of the spring is suitably secured to the inner surface of the housing 19, as indicated at 37. The spring 35 is pre-wound, so to speak, in such manner that it normally urges the reel 31 to rotate in the direction of the arrow 38, thereby tending to wind the aforementioned cable 15 upon the reel, or more specifically, upon the shaft 30 of the reel, as will be readily understood.

Figure 2:
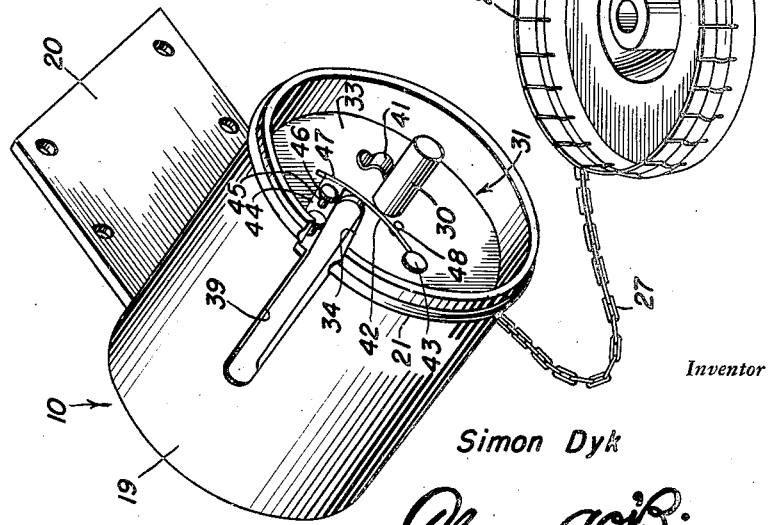
Figure 2 is a perspective view of the invention per se, the same having the cover thereof removed, so as to reveal its construction.

The cable 15 enters the housing 19 through the medium of a slot 39 which extends longitudinally in the lateral wall of the housing, as is best shown in Figures 2 and 4.

After being wound around the shaft 30 of the reel 31 the cable 15 passes through the aforementioned slot 34, and the end portion 40 of the cable is releaseably secured to the flange 33 of the reel by means of a clamp 41 with which the outer surface of the flange 33 is provided.

However, before being secured under the clamp 41, the end portion 40 of the cable 15 passes over a leaf spring 42, one end of which is secured to the flange 33 as at 43, while its remaining end bears against a radially projectable dog 44.

This dog is slidably mounted (by means of the slots 45 and retaining pins 46) on the flange 33, the spring 42 normally urging the dog 44 outwardly, so that as the reel 31 rotates, the dog will engage the slot 39 in the drum 19, and one longitudinal edge of the slot (39) will function as an effective stop, whereby further rotation of the reel will be prevented.

However, it should be noted that this stopping action occurs only in the absence of the cable 15, that is to say, as long as the inner end portion 40 of the cable engages the spring 42, the dog 44 is not permitted to engage the slot 39, and rotation of the reel 31 remains unrestricted. In this connection, it should be explained that the outer end portion of the spring 42 is rigidly secured by welding, or the like, to the adjacent end portion of the dog 44, as indicated at 47.

Excessive inward movement of the dog 44 and of the associated spring 42 is prevented by means of a stop pin 48, provided in the flange 33 of the reel.

Accordingly, when the invention is placed in use, the device 10 is secured to the seat support 16 of the tractor 11 as already described, and the cable 15 is attached to the actuating lever 14 of the implement 12, whereby the spiral spring 35 will normally retain the cable in a tense position, so that when the operator of the tractor pulls the cable in the direction of the arrow 17, the lever 14 will be instantly actuated, rather than a considerable portion of the actuating movement being lost in the take-up of slackness which was previously encountered when the forward end portion of the cable was attached directly to the tractor.

Needless to say, the spring 35 will facilitate rotation of the reel 31 to such extent that the draw bar 13 may have any desired length, without impairing the cable tensioning efficiency of the device, as already described.

Moreover, if the draw bar 13 should become accidentally or unintentionally disconnected from the tractor 11 (or from the implement 12 as the case may be), the frictional engagement of the clamp 41 with the inner end 40 of the cable 15 is such as to permit the reel 31 to unwind, whereupon the cable portion 40 will be automatically released from the clamp 41, so that the drawn implement 12 may come to a stop, while the tractor 11 may continue its forward movement.

In this manner, not only will the breakage of the cable 15 be prevented and damage which the entire tensioning device would otherwise sustain be eliminated, but full winding of the reel 31 will be effectively prevented, such as would otherwise occur under the influence of the spring 35.

That is to say, in the instance of the disconnection of the draw bar 13, the reel 31 will be unwound by the unwinding cable, so that when the end 40 of the cable 15 ultimately becomes released from the clamp 41, the resiliency of the spring 42 will project the dog 44 outwardly into engagement with the slot 39, so that rotation of the reel 31 under the resiliency of the spring 35 will be prevented.

Thereupon, after the draw bar 13 has been re-connected, the cable 15 may be reapplied to the reel 31, without the necessity of rotating the reel in order to properly adjust the tension of the spring 35.

Referring now to the modified embodiment of the invention illustrated in the accompanying Figures 6 and 7, the same is identical to the embodiment already described, with exception that it includes means for preventing the unwinding of the cable 15 from the reel when the lever 14 of the implement 12 is to be actuated.

That is to say, by observing the illustration in Figure 1, it will be apparent that when the cable 15 is pulled in the direction of the arrow 17 to actuate the lever 14, a tendency will exist to unwind the cable from the reel in the housing 19 as well as to actuate the lever 14, which tendency, if carried to an extreme, would result in the unwinding of the reel, without any actuation of the lever 14.

To eliminate this possible inefficiency or lost motion, the embodiment shown in Figures 6 and 7 is provided with a check mechanism designated generally by the reference character 50 which is housed in the frame work or drum 19.

In this embodiment, the reel 51 is similar to the aforementioned reel 31, comprising the spiral spring 52, a shaft 53 and a pair of flanges 54, 55. One of these flanges (55) is equipped with the slot 34, the spring 42 and the radially projectable dog 44, as in the embodiment already described.

However, the flange 54 of the reel 51 is formed with a plurality of teeth 56, so that it assumes the function of a ratchet, while a coacting pawl 57 is rigidly secured to a rod or shaft 58, rotatably journaled in the end wall 22 of the housing 19 and in a bracket 59 with which the housing is provided as is best shown in Figure 6.

It should be noted that the shaft 58 is disposed adjacent the opening or slot 39 of the housing and a portion of the surface of the shaft (58) is knurled as at 60, for a purpose hereinafter to be more fully described.

A coil spring 61 is also provided on the shaft 58, one end of this spring being secured to the shaft as at 62, while the remaining end of the spring is anchored to the housing 19, as at 63. The function of the spring 61 is to normally urge the pawl 57 out of engagement with the ratchet teeth 56 of the flange 54, so that unrestricted rotation of the reel 51 will be facilitated.

When this embodiment of the invention is placed in use, the pulling of the cable 15 in the direction of the arrow 17 will result in the engagement of the cable with the knurled portion 60 of the shaft 58, whereby the pawl 57 will be brought in engagement with the ratchet teeth 56, against the resiliency of the spring 61.

As a result, unwinding of the reel 51 will be effectively prevented, so that the pulling force exerted upon the cable 15 in the direction of the arrow 17 will be most effectively utilized in actuating the lever 14, without the possibility of unwinding the cable 15 from the reel 51, as will be clearly understood.

Needless to say, as soon as the pulling force upon the cable 15 is relaxed, the spring 61 will disengage the pawl 57 from the ratchet teeth 56, and unrestricted rotation of the reel 51 will be facilitated.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A cable tensioning device, comprising a frame, a reel rotatably mounted in said frame and including a side flange formed with a recess, a spiral spring operatively connected to said reel, and a spring-pressed dog projectably mounted on said flange, said frame forming a stop engageable by said dog, said reel being adapted for the winding of a cable thereon, said cable passing through said recess and operatively engaging said dog.

2. The device as defined in claim 1 together with a clamp secured to said flange and frictionally engaging an end portion of said cable.

3. A cable tensioning device, comprising a drum-shaped housing formed with a longitudinally extending slot, a reel rotatably mounted in said housing and including a side flange provided with a recess, a spiral spring connected at one end thereof to said reel and at its remaining end to said housing, a radially projectable dog slidably mounted on said flange and a leaf spring urging said dog in engagement with said slot, said reel being adapted for the winding of a cable thereon, said cable passing through said recess and engaging said leaf spring whereby said dog is normally retained in a retracted position.

4. The device as defined in claim 3 together with cable actuated means for preventing unwinding of said reel independently of the engagement of said dog with said slot.

5. The device as defined in claim 3 together with a ratchet provided on said reel, a coacting pawl pivoted in said housing, resilient means for normally disengaging said pawl from said ratchet, and an actuating member provided on said pawl, said member being engageable by said cable.

6. A cable tensioning device comprising in combination, a drum-shaped housing formed with a longitudinally extending slot, a reel rotatably mounted in said housing and including a pair of side flanges, one of said flanges being provided with a recess, a spiral spring connected at one end thereof to said reel and at its remaining end to said housing, a radially projectable dog slidably mounted on the recessed flange, a leaf spring urging said dog in engagement with said slot, said reel being adapted for the winding of a cable thereon, said cable passing through said recess and engaging said spring, the remaining of said flanges constituting a ratchet, a coacting pawl pivoted in said housing, resilient means for normally disengaging said pawl from said ratchet, and an actuating member provided on said pawl, said member being engageable by said cable.

SIMON DYK.

REFERENCES CITED

The following references are of record in the file of this patent:

UNITED STATES PATENTS

| Number | Name | Date |
| --- | --- | --- |
| 64,319 | Hubbell | Apr. 30, 1867 |
| 875,280 | McGarin | Dec. 31, 1907 |
| 938,359 | Wedell | Oct. 26, 1909 |
| 1,683,306 | Ryan et al. | Sept. 4, 1928 |

FOREIGN PATENTS

| Number | Country | Date |
| --- | --- | --- |
| 282,529 | Great Britain | Dec. 29, 1927 |